Feb. 24, 1970     MASAO MASUDA     3,497,311
METHOD FOR TREATING KNITTED OR WOVEN MATERIAL WITH
LIQUID AND AN APPARATUS THEREFOR
Filed Oct. 6, 1967     6 Sheets-Sheet 1

INVENTOR.
MASAO MASUDA
BY
Woodhams, Blanchard & Flynn
ATTORNEYS

United States Patent Office 3,497,311
Patented Feb. 24, 1970

3,497,311
METHOD FOR TREATING KNITTED OR WOVEN MATERIAL WITH LIQUID AND AN APPARATUS THEREFOR
Masao Masuda, 80, 2-chome Shimoyama-cho, Mizuho-ku, Nagoya-shi, Japan
Filed Oct. 6, 1967, Ser. No. 673,454
Claims priority, application Japan, Jan. 13, 1967, 42/28,330; May 4, 1967, 42/53,851; May 23, 1967, 42/2,209; Aug. 22, 1967, 42/32,699; Sept. 8, 1967, 42/57,275
Int. Cl. B05c 3/02
U.S. Cl. 8—152
25 Claims

ABSTRACT OF THE DISCLOSURE

A knitted or woven material is treated with liquid by circulating it together with the liquid through a substantially U-shaped treating vessel comprising an up-going path having a large cross sectional area, a down-going path having a small cross sectional area, and an intermediate path connecting these two paths, in such a manner that the material is drawn up from the up-going path by a feeding means provided thereabove, is passed through the down-going path together with the liquid drained from the up-going path and supplied into the down-going path from thereabove and is urged to ascend through the up-going path while being gradually unfolded, spread and stretched in a direction transverse to the direction of movement of the material and then is folded in the direction of movement of the material in the bottom portion of the up-going path.

BACKGROUND OF THE INVENTION

Field of the invention

The present invention relates to a novel method for rapidly conducting dyeing, degumming or other treatments of knitted or woven materials, especially woven fabrics, knitted goods and other cloths, without damaging the quality and impairing the feel thereof, and also relates to an apparatus for putting said novel method into practice.

Description of the prior art

Typical dyeing methods of the prior art include one which utilizes a winch and another one which utilizes a jigger, and further include the beam dyeing method and the rotary dyeing method. However, these prior methods invariably had disadvantages, namely, that not only a considerable length of time was required to complete the dyeing, but also they gave rise to the problem of the development of creases and markings such as patched selvages. Further, when cloths were dyed, there was a tendency that their faces became roughened due to the development of nap and broken pattern or that the cloths became hardened due to the applied tension which occurred during the dyeing process, resulting in their feel being spoiled greatly. For knitted materials and woven materials, especially for woven fabrics, knitted goods and other cloths, "feel" is a very important element required for good quality. Therefore impairment of feel is, in fact, detrimental to these articles, especially to those of sheer texture.

Recently, a new dyeing technique for conducting high speed dyeing has been developed and put into practice. This technique uses a jet nozzle for drawing up a piece of cloth to be treated from the dyeing bath wherein it is immersed, and the apparatus is designed so that the cloth is circulated through a tube and a dyeing bath. Although this method permits the dyeing to be carried out at a high speed, it has a disadvantage that the cloth is exposed to a considerably great amount of tension during the circulation of the cloth in the treating system, resulting in that the finished cloth is undesirably hard with a loss of feel. This method has a further disadvantage that the cost of the equipment is great. Accordingly, this prior method is not suited for the dyeing of those materials, such as woven fabrics and knitted goods, of sheer texture, because they would, when subjected to an excessively great amount of tension, lose their desired feel to a considerable degree. This prior method is not suitable either for the dyeing of materials such as those of sheer texture, in particular, whose feel is impaired when placed under an excessive amount of tension during the treatment, or for the dyeing of material, such as jersey fabrics, which tend to easily develop stretching of their loops.

SUMMARY OF THE INVENTION

After an extensive research to find a method for dyeing knitted materials and woven materials, especially cloths, which method is free from the foregoing shortcomings of the prior art, the inventor has found a new method and an apparatus to be used therefor which are suitable for carrying out the dyeing, degumming or other treatment of such materials with a liquid without damaging the quality and impairing the feel of the materials to be treated and which permit a high speed treatment.

It is, therefore, a primary object of the present invention to provide a method and an apparatus therefor for improving the quality of knitted materials and woven materials by treating them with a liquid, while minimizing the adverse effect thereon from the current of the treating liquid on the materials to be treated and also minimizing the tension applied to the materials to be treated as they are transferred from one place to another in the treating system.

Another object of the present invention is to provide a method and an apparatus therefor which are suitable for the treatment of the foregoing materials with a liquid at a high temperature and/or under a high pressure.

Still another object of the present invention is to provide a relatively simple method and an apparatus therefor having a relatively simple structure which are suitable for a high speed treatment of the foregoing materials with a liquid.

BRIEF DESCRIPTION OF THE DRAWING

FIGS. 1 through 3 are schematic representations, showing representative embodiments of the apparatus of the present invention, in which

FIGS. 9 through 12 are schematic representations of arrangements in which a bypass is provided between the enlarged bottom portion and the adjacent iso-calibrated portion of the up-going path, in which

FIGS. 13 through 15 are schematic representations of arrangements in which a bypass is provided for the iso-calibrated portion of the up-going path, in which

FIGS. 18 through 20 are schematic representations of arrangements in which both the down-going path and the iso-calibrated portion of the up-going path are divided into two or more corresponding sections, respectively, in such a manner that one section of the down-going path together with the corresponding section of the up-going path form a pair, and in which both perforated partition walls and bypasses are jointly provided for the enlarged bottom portion as well as the iso-calibrated portion of the up-going path, in which

FIGS. 21 through 23 are schematic representations of various arrangements of the up-going path in which the iso-calibrated portion is divided into two or more sections and in which bypasses are provided between the enlarged bottom portion and the adjacent section of the iso-calibrated portion, or further between the sections of the iso-calibrated portion, in which

FIGS. 24 through 26 are schematic representations of various other arrangements of the up-going path in which the iso-calibrated portion is divided into two or more sections and in which the enlarged bottom portion as well as the iso-calibrated portion are provided with perforated partition walls and bypasses, respectively, in which

FIGS. 27 through 29 are diagrammatic representations of various arrangements of the enlarged portion located in the bottom of the up-going path, in which said enlarged portion is provided with means for controlling the degree of unfolding of the material to be treated, in which

FIGS. 36 through 38 are diagrammatic representations, showing means for controlling the cross sectional area of the path through which the material moves, in which

PREFERRED EMBODIMENTS OF THE INVENTION

The following description will be directed to the details of the present invention as carried out, by way of example, in a dyeing operation by referring to the accompanying drawings.

Figure 1:
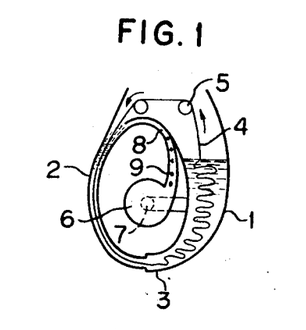
FIG. 1 is a longitudinal sectional view of the open type of treating apparatus.
Figure 2:
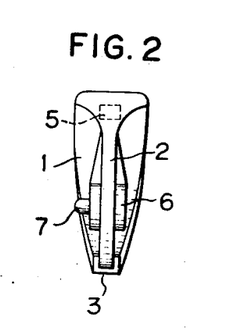
FIG. 2 is a side elevation of the apparatus in FIG. 1.
Figure 3:
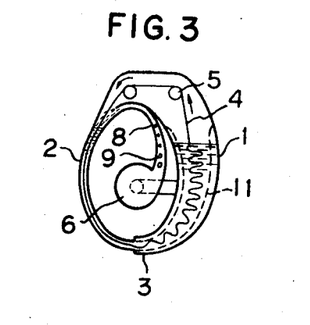
FIG. 3 is a longitudinal sectional view of the closed type of treating apparatus.

FIGS. 1 through 3 are schematic representations, showing typical examples of apparatus for use in putting the method of the present invention into practice, and they are intended to indicate the principle of the present invention.

Referring now to FIGS. 1 and 2 of the drawing, the treatment vessel is of a generally U-shaped configuration, and comprises an up-going path 1 having a large cross sectional area, a down-going path 2 having a small cross sectional area and an intermediate path 3 connecting the up-going path and the down-going path at their lowermost ends. In order to describe the configuration of the treatment vessel, the terms "U-shape" and "U-shaped" are used in this specification. These terms are intended to explain the general configuration of the treatment vessel as a whole, and they do not mean that the up-going path and the down-going path, which correspond to the substantially linearly extending legs of the literal U-shape, cannot be connected to each other at the top ends thereof, nor do they imply that the paths extending on both sides of the U-shaped vessel must necessarily be linear, strictly in the shape of the letter U. In short, the treatment vessel may have any configuration provided that the configuration does not in any way hamper the performance of the treatment which is carried out according to the present invention.

The terms "a large cross sectional area" and "a small cross sectional area" used in this specification mean the relative sizes of the up-going and the down-going paths and they do not imply any particular absolute value of the cross sectional area.

The terms "unfolding," "spreading" or "stretching" hereinafter used in this specification refer to the fact that the material as it passes through the up-going path can spread or move apart in a direction transverse to the direction of movement of the material. These terms do not necessarily mean that the unfolding, spreading or stretching of the cloth to be treated occurs to the full extent of its width and length, but they are used in a relative sense and are to be differentiated from the state of the cloth in the so-called "rope form" which term is also used in this specification to refer to the fabric in a transversely bunched condition. The extent to which the cloth is unfolded, spread or stretched can vary depending on such factors as the type of the cloth, the diameter of the up-going path and the conditions under which the treatment is performed. However, the material in rope form is transversely unfolded and spread to an extent which is usually on the order of several tens percent of its width. Also, the term "to be folded" hereinafter used in this specification does not necessarily mean that the cloth is folded to a full extent. The implications of these terms mentioned above will become apparent as a matter of course as the description of the present invention proceeds in the following specification.

The aforesaid up-going path 1 has a cross sectional area which is normally about twice to about twenty times that of the down-going path 2. The configurations of the cross sections of these two paths are normally either circular, rectangular or oval, but the configuration is not restricted to these three shapes. The term "cross sectional area of the up-going path having a large cross sectional area" as used in this specification normally means the cross sectional area of this path per se. In case, however, this path is provided with a perforated partition wall spaced from and disposed along the inner wall face of the path, the cross sectional area of the up-going path means the cross sectional area which is defined by this partition wall installed in said path. The up-going and down-going paths 1 and 2 may have open top ends, or they may extend and may be connected to each other at upper ends or they may have their upper ends connected to each other by any appropriate means so as to provide a treatment vessel of the closed type (FIG. 3). The choice of the type of vessel depends on the purpose of the treatment and/or the conditions under which the treatment is performed. In case it is desired to conduct a treatment at an elevated temperature and/or under an elevated pressure, the closed type vessel is used, while in case it is intended to carry out a treatment not requiring an elevated temperature and/or an elevated pressure, a vessel of the open type is used.

Figure 4:
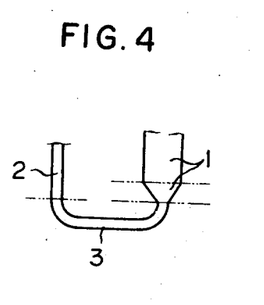
FIGS. 4 through 6 are diagrammatic representations, showing the relationship between the intermediate path connecting the up-going path and the down-going path, and showing different embodiments.
Figure 5:
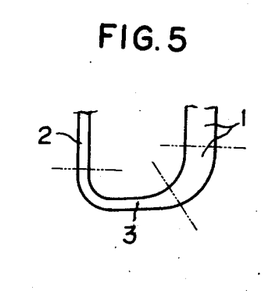
Figure 6:
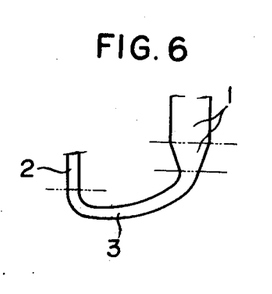

FIG. 1 shows an example of an open type vessel, while FIG. 3 illustrates an example of a closed type vessel. In FIG. 3, the broken line 11 shown inside the up-going path 1 represents a perforated partition wall. The bottom portion of the up-going path 1 having a large cross sectional area must be structured so that the flow speed of the treating liquid which flows therein from the intermediate path 3, which connects the down-going path 2 to the up-going path 1, namely, from the lowermost entrance of the up-going path 1, is not very great but is such that the flow speed is gradually reduced. By this arrangement of the structure of the bottom portion of the up-going path 1, in association with the structure of the intermediate path 3, a desired flow speed of the treating liquid in said bottom portion of the up-going path 1 is obtained. The intermediate path 3, is shaped so as to connect the paths 1 and 2 together at their lowermost ends. However, the path 3 may have any desired shape provided that it is structured so as to permit the current of the treating liquid, coming from the down-going path 2 having a small cross sectional area and flowing into the up-going path 1 having a large cross sectional area, to achieve a desired flow speed when the current of the liquid enters into the lowermost end portion of the up-going path 1, in association with the structure of the bottom portion of said path 1. Thus, no limitation is imposed on the shape and so forth of the cross section of the intermediate path 3. According to the present invention, a knitted or woven material to be treated, which is transferred in a rope form together with the current of the treating liquid, is adapted to be transversely unfolded, spread and stretched to an appropriate extent and rendered to a state in which the material can be easily longitudinally folded in the bottom portion of the up-going path 1 and this is effected by utilizing the slowed-down flow speed of the current of the treating liquid as it flows from the down-going path 2 into the up-going path 1, in association with the resisting force of the liquid already contained in the up-going path 1 which is applied to the in-coming current of the liquid in the up-going path 1. Thereafter the material is adapted to be longitudinally folded as it ascends through the up-going path 1, and thus the material can be given a desired treatment. Accordingly, the reduction in the flow speed of the current of the treating liquid has to be arranged so as to meet this requirement. In any case, a sharp drop in the flow speed of the current of the treating liquid which would occur at the moment this current enters into the entrance of the up-going path 1 at the bottom hereof is not desirable. Neither is it desirable that the flow speed of the current of the treating liquid drops excessively while the current is still running in the intermediate path 3 at a considerable distance from the entrance of the up-going path 1, or in other words, it is not desirable that the flow speed of the current effects an excessive drop prematurely. The structures of the intermediate path 3 and the bottom portion of the up-going path 1 should be designed so that the flow speed of the current of the treating liquid will undergo a timely and gentle reduction in such fashion as to meet these requirements. The intermediate path 3 may have a constant cross sectional area for a distance until it reaches the bottom end of the up-going path 1. Or, alternatively, it may have a continuously varying cross sectional area until it joins the up-going path 1. Or, further alternatively, it may have portions of altered cross sectional areas at desired sites along the length of this path, that is, its cross sectional area may change stepwise. The position at which the flow speed of the current of the treatment liquid is altered and the degree of the change in the flow speed are determined by taking into account the factors such as the type of the knitted or woven material to be treated and the purpose of the treatment. In FIGS. 4 through 6 are shown examples of the structural relationship between the bottom portion of the up-going path 1 and the intermediate path 3. The phantom lines given in FIGS. 4, 5 and 6 indicate the boundaries of the paths 1, 2 and 3, respectively. In FIG. 4, the intermediate path 3 has a continuous uniform cross sectional area until it joins the bottom end of the up-going path 1. The lower portion of the up-going path 1 is of a configuration which is substantially an inverted frusto-conical shape commencing at the junction of the up-going path 1 and the intermediate path 3, or in other words, it has an upwardly flaring funnel shape. In FIG. 5, the intermediate path 3 has a gradually increasing cross sectional area as it approaches the up-going path 1. The up-going path 1 also has a gradually increasing cross sectional area for a certain predetermined distance beginning at the site at which it joins the intermediate path 3, namely, beginning at the bottom end of the up-going path 1. In FIG. 6, the intermediate path 3 has a gradually increasing cross sectional area as it approaches the up-going path 1, but the latter path 1 has a structure similar to the one shown in FIG. 4. The material, which is transversely unfolded, spread and stretched and is rendered to a state in which it is capable of being easily folded in the bottom portion of the up-going path 1, is longitudinally folded during its travel upwardly through the path 1. The material which is in such state is caused to gradually move upwardly by being driven by the up-going current of the treating liquid and also by its own buoyancy. In the upper portion of the up-going path 1, the material is in a relatively stationary state. The material 4 which is in the upper portion of the up-going path 1 having a large cross sectional area is drawn up by a feeding means 5 provided above the up-going path 1 and is transferred therefrom to the upper end of the down-going path 2 which has a small cross sectional area, the transfer occurring in the direction indicated by the arrow in FIGS. 1 and 3. The feeding means is usually a reel or roller or the like which is driven from an appropriate driving source. However, the feeding means may be replaced by any desired device provided that it is capable of performing the operation of drawing up and feeding the material which is to be treated. There is no limitation on the number of the reels or the like which are used. There may be provided an idle reel and a guiding rod or the like as required. Also, a suppressing roller may be provided in order to prevent slipping of the material running on the reel. Great convenience will be obtained by arranging the suppressing roller so that it may be switched from one position over to another, manually for example, in order that the suppressing roller may be put into operative state only when this is necessary. At the moment that the material to be treated is about to be drawn up from the up-going path 1, it is in the state of a pile of folds. When the material is fed into the down-going path 2, however, it is in such a state that it may be easily changed to a rope form during its travel downwards through the down-going path 2. To this end, the provision of, for example, a guide means ahead of the take-up and feeding reel will be of great help since it facilitates the subsequent formation of the rope form. Needless to say, any other suitable means may be provided to attain this end.

It is considered that a great tension is applied to the knitted material or woven material when it is drawn up from the upper portion of the up-going path 1 by the feeding means. In the present invention, however, the relatively stationary material in the upper portion of the up-going path 1 is in such a state that the upper portion of the material is either located very close to the face of the liquid contained in said path or is emerging from the surface of the liquid in the form of a pile of neat folds. Therefore, the material can be easily drawn up, and, thus, there is hardly any tension applied to the material. Even when there is an amount of tension applied to the material, this amount is much smaller than that applied to materials when treated according to other prior methods including the one which utilizes a jet nozzle for drawing up, at a high speed, the materials, such as cloth, from the dyeing bath.

The operation consisting of draining a part of the treating liquid from the up-going path 1 and supplying the same into the down-going path 2 from thereabove is usually performed by a pump. Such draining of the treating liquid is usually performed at the intermediate portion of the up-going path 1. In the drawing, reference numeral 6 represents a pump. Numeral 7 represents a conduit for leading the liquid from the up-going path 1 to the inlet side of the pump. Numeral 8 represents a conduit for leading the liquid discharged from the outlet side of the pump to the upper end of the down-going path 2. The term "the upper end of the down-going path" herein used does not necessarily mean the top edge as same may mean if strictly interpreted, but implies either the top end or a portion close thereto. Therefore, there is no particular limitation implied in the use of this term provided that the objects of the present invention can be attained without any trouble.

Figure 7:
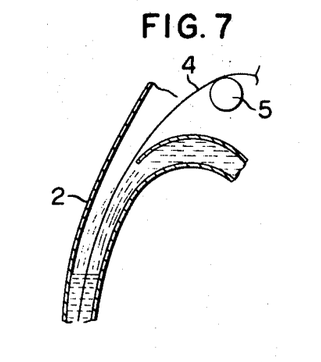
FIG. 7 is a diagrammatic representation, showing the manner in which the material to be treated, which is fed by feeding means, joins the current of the treating liquid which is injected into the down-going path from thereabove by a pump.

In case the operation must be carried out at an elevated temperature, the duct 8 is provided with a heater made of a coiled pipe 9 as shown, by way of example, in FIG. 1, so that the heating may be carried out by steam. Alternatively, the duct 8 may be one which is of the heat-exchanger type. Also, heating may be effected by the provision of a heating means such as a coil heater. In case the heating is performed by the provision of a steam pipe between the inner wall face of the up-going path 1 and the perforated partition wall, it is possible to easily obtain a temperature of 100° C. or higher even under normal pressure, and therefore this arrangement is most convenient. The heating methods are subject to no particular limitation with respect to the site at which heating is carried out or the means of heating. Any appropriate heating method may be employed. Heating is performed usually after the material to be treated is charged into the apparatus or after a certain degree of heating has been conducted preliminarily before the material is charged. The choice depends on such factors as the type of the material and the purpose of the treatment. The treating liquid which is delivered from the pump is supplied into the down-going path 2 having a small cross sectional area from thereabove so that the liquid is allowed to flow downwardly therethrough. The liquid is drained usually at a rate of 5 to 15 liters per second. The pump which is used in the present invention must produce a force only to an extent sufficient for accomplishing the operation consisting of draining a part of the treating liquid and injecting it into the down-going path 2 from thereabove. The pump, according to the present invention, is not required to produce a great pressure. For this reason, a pump of a "small head, large capacity" type is preferred. The provision of a powerful pump or like means, such as a centrifugal pump, which has been used in the prior method utilizing a jet nozzle for effecting a high-speed draw-up of the material to be treated from the dyeing bath is not necessary in the present invention. The pump used in the present invention has a small horsepower which is on the order of about a quarter of the horsepower required in the prior art pumps. The knitted or woven material which is fed by the feeding means is supplied to the opening located at the top of the down-going path 2 so as to be carried along by the current of the treating liquid which is injected by means of the pump. This operation is illustrated in FIG. 7. The feeding of the material is performed solely by virtue of the driving force produced by the feeding means. The treating liquid which is injected by means of the pump has nothing to do with the feeding of the material. While there is no need for the provision of any special means at said opening of the down-going path 2 for feeding the material thereinto, there may be provided a guide plate or like means at such site in order to perform a smooth feeding of the material.

Figure 8:
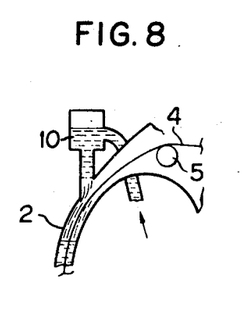
FIG. 8 is a schematic representation, showing an apparatus in which a head tank for the treating liquid is provided above the down-going path.

The provision of a head tank 10 above the down-going path 2 having a small cross sectional area, as shown in FIG. 8, so as to effect, before the liquid drawn up by the pump is allowed to proceed through this path, the storage of the drawn-up liquid in this head tank, is desirable because, by so arranging, the material can be kept from being directly subjected to the pressure from the pump. The treating liquid is injected by means of the pump in such a manner that the level of the treating liquid in the down-going path 2 having a small cross sectional area when the material to be treated is contained therein is held higher than the level of the liquid contained in the up-going path 1 having a large cross sectional area. However, an excessive difference in the head of the liquid between these two paths is undesirable because otherwise the material to be treated will be subjected to an excessive amount of tension. The difference in the head between these two paths is normally smaller than about 50 cm. but it may be in the range of from about 10 to 50 cm. Along with the downward current of the treating liquid in the down-going path 2, the material to be treated is urged to proceed downwardly in the form of a rope. Thus, it becomes possible to effect the desired downward movement of the material which, in the apparatus of the prior art, would tend to become folded and remain relatively stationary in the path. The flow speed of the current of the treating liquid is substantially equal to the speed at which the material being treated is transferred. The material which flows downwardly in a rope form together with the current of the treating liquid, passes through the intermediate path 3, and when it arrives at the entrance of the up-going path 1 located at the bottom thereof, the rope-form material is transversely unfolded, spread and stretched to an appropriate extent and is further converted to a state in which it is capable of being easily folded longitudinally, by virtue of the reduced flow speed of the current of the treating liquid as the current enters into the bottom portion of the up-going path 1 having a large cross sectional area, in association with the internal pressure of said material and also with the resistance applied to the material from the liquid already contained in said path 1, and eventually, the material is longitudinally folded. The folded material then gradually moves upwardly as it is urged by the ascending current of the treating liquid and also by virtue of the buoyancy of the material itself. According to the present invention, the knitted or woven material is circulated through the system at a speed of about 10 to 100 meters per minute, normally. Accordingly, it will be understood that the present invention can be applied widely to operations of various types which are conducted at various different speeds from low speed to high speed. The speed which can be applied to industrial purposes according to the recently utilized method which uses a jet nozzle in order to effect the drawing-up of a length of cloth from the dyeing bath at a high speed, is in the range of from about 40 to 100 meters per minute at best. Therefore, this prior method may be said to be inapplicable to an operation which is to be conducted at a speed lower than that. According to the present invention, the amount of tension imposed on the material during its travel through the treating system is extremely small and normally is less than about 10% of the amount of tension applied to the material according to said prior method.

The following description will be directed to the manner in which the material is placed onto the reel. In case the apparatus used is the closed type, for example, the material is introduced into the apparatus through the opening located beneath the top cover and is applied onto a reel for engagement therewith while the reel is rotated. On the other hand, the pump is actuated to inject the treating liquid into the down-going path 2 from its upper end so that the material fed by the reel is urged to join the current of this liquid. When the forward tip of the material arrives at the top face of the treating liquid contained in the up-going path 1, the material is drawn upward, and said forward end edge of the drawn up material is then connected to the other end of the material to form an endless web. Whereupon, the top opening of the apparatus is closed by placing the cover thereon, and then the treating operation is commenced. When the operation described above is completed, the material is removed from the apparatus in a manner reverse to that employed in the initial preparatory step. There has been described one example of operation. It should be understood, however, that the manner of operation is not restricted thereto.

Figure 9:
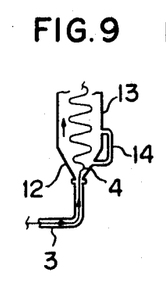
FIG. 9 is an arrangement in which the bypass is not provided with a valve.

The manner in which the flow speed of the current of the treating liquid is reduced as it enters into the bottom portion of the up-going path 1 so as to cause the material to be transversely unfolded, spread and stretched and eventually longitudinally folded by virtue of this slowed-down speed of the current of liquid, has been described already. While this slowing-down of the flow speed of the current of the treating liquid should be effected gradually and smoothly, this is not always easy in actual operations depending on the purpose of the treatment and/or the conditions under which the treatment is conducted. Especially in operations where a high speed is required, the lack of smooth sequential reduction in the flow speed of the current of the treating liquid would often cause turbulent flow in the bottom portion of the up-going path 1. It would also cause a difference between the flow speed of the treating liquid and the speed of movement of the cloth and/or cause the cloth to be retained even for a short period of time in the bottom portion of the up-going path due to many reasons. Eventually the portions of the cloth which are transferred into this bottom portion following the preceding portions tend to catch up with said retained preceding portions and get entangled therewith. This phenomenon is apt to occur especially at the respective joints of a cloth of a considerable length. When such a phenomenon occurs, it will hamper effective, continuous operation. At the worst, the operation may have to be suspended. Even if this phenomenon is not so intensive that it would result in the impairment of the operation, still it will be undesirable because, where the operation is that of dyeing, for example, the phenomenon will constitute a cause for an uneven finish of the dyeing, and also may well be the cause for the roughness of the faces and a loss of desirable feel of the finished cloth. Especially when the material is longitudinally folded and also when the already folded material is transferred through the up-going path, it is necessary that the material be folded neatly and regularly and also that the material which has been already folded be transferred in well-sequenced order. As such, a mere high speed is not all that is necessary, but an adjustment of the flow speed of the current of the treating liquid is of the greatest importance. It is necessary to appropriately adjust the flow speed of the current of the treating liquid in association with the movement of the material to be treated. This will be hereunder explained by referring to the drawing. In FIG 9, the material 4 and the treating liquid are fed through the intermediate path 3 in the direction as indicated by the arrow. The intermediate path 3 has a constant diameter up to the portion where it joins the adjacent enlarged portion 12 located at the bottom of the up-going path 1. From this intermediate path 3, the current of the treating liquid enters into the enlarged portion 12. Here, the flow speed of the liquid drops, which is followed by a reduced movement of the material, and the material is transversely unfolded and is longitudinally folded or rendered to a state in which it can be easily longitudinally folded. The degree of reduction in the flow speed of the current of the treating liquid varies with the degree of the inclination of the inner wall face of the enlarged portion 12. It should be clearly understood that a gentle and gradual decrease in the flow speed of the current of the liquid can be obtained by arranging the wall so as to have a gently and gradually inclined face. In practice, however, the provision of a gently sloped wall will result, due to its relationship with the capacity of the path, in an increased height of such portion of the path. In an apparatus of upright type, in particular, such an arrangement of the wall slope will lead to a greatly increased overall height of the apparatus, and therefore, there is a limitation to the degree of inclination of the wall face of this enlarged portion. Accordingly, if the apparatus is used particularly in a high speed treatment, there should naturally be a certain limit to the degree of reduction in the flow speed of the current of the liquid effected by the adjustment of the degree of inclination of the wall face of the enlarged portion 12, and this limit, in turn, can often constitute a cause for the troubles in the aspect of neat folding of the material to be treated. In the enlarged portion 12, the speed of movement of the material drops usually to the order ranging from $\frac{1}{100}$ to $\frac{1}{30}$ of the speed at which the material has been travelling up to this portion 12. In case the flow speed of the current of the liquid entering into the up-going path 1 is too great, there will arise turbulence of the current of the liquid, and also the portions of the material which are brought into the enlarged portion of the up-going path 1 following the preceding portions will catch up with and pass said preceding portions so as to be positioned ahead of these preceding portions and get entangled therewith eventually. This entanglement is related also to the type and hardness of the material to be treated, and to the temperature employed. In order to solve this problem, it is desirous to resort to the following steps.

As a first step for a solution of this problem, it is desirable to provide, for example, a perforated partition wall 11 arranged vertically along the inner wall of the up-going path 1 having a large cross sectional area, in the manner shown in FIG. 3. This arrangement not only will prevent any adverse effect due to the current of the treating liquid coming from down-going path 2, but also such current of the liquid is effectively utilized, and at the same time it prevents the material from being sucked into the pump. In this arrangement, the total area of the holes of the perforated partition wall is preferably about 10 times or more the cross sectional area of the suction pipe 7 of the pump. This perforated partition wall may be provided along the entire inner wall of the up-going path 1 in a spaced relation therewith or locally therealong. Or alternatively, it may be provided only in the vicinity of the suction pipe of the pump. There is no particular restriction on the shape of the perforated partition wall and the shape of the holes thereof. In any case, the perforated partition wall need be such that it will permit the liquid coming from the bottom entrance of the up-going path 1 to pass through the perforations of the partition wall toward the wall of the up-going path 1 and then to come out from the perforations so as to reduce the speed of the current of the liquid. To this end, the perforated partition wall may be made, for example, in net or screen form.

Figures 10, 13:
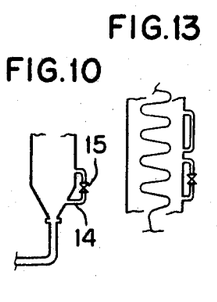
FIG. 10 is an arrangement in which the bypass is provided with a valve.
FIGS. 13 and 14 are arrangements in which only a bypass is provided.
Figure 11:
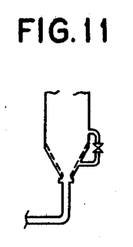
FIG. 11 is an arrangement similar to FIG. 10 but in which a perforated partition wall is additionally provided only in the enlarged portion located at the bottom of the up-going path and FIG. 12 is an arrangement similar to FIG. 10 but in which a perforated partition wall is additionally provided in both of the enlarged bottom portion and the iso-calibrated portion of the up-going path.
Figure 12:
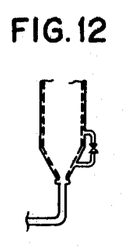

As another means of solving the aforementioned problem, it is desirable to adopt the following arrangement. In order to effect an appropriate reduction and to make adjustment of the flow speed of the current of the liquid passing through the system in the order of 3→12→13 in compliance with the inclination of the wall face of the enlarged portion 12 located at the bottom of the up-going path, there is provided a bypass, for example a pipe 14, between the enlarged portion 12 and the iso-calibrated portion 13 so that a part of the liquid coming from the intermediate path 3 into the enlarged portion 12 may freely pass through said bypass 14 to flow into the iso-calibrated portion. The term "the iso-calibrated portion" herein referred to is used to differentiate it from the enlarged portion 12 and does not imply any particular absolute value. FIG. 9 illustrates this relation. In this instance, it will be convenient to provide, as shown in FIG. 10, a valve 15 on the bypass 14 so that the flow rate of the liquid passing through the bypass 14 may be controlled in conformity with the degree of the slowed-down speed of the current of the liquid. By so arranging the liquid flow, it will become possible to freely control the degree and the manner of the longitudinal folding of the material in accordance with the flow speed of the current entering into the enlarged portion 12 from the intermediate path 3. A further convenience will be obtained by providing a "peep window" in the enlarged portion 12 since this will permit the operator to adjust the valve 15 as desired while watching the condition inside this portion. It is also desirable to provide the perforated partition wall 11 jointly with the bypass 14. Specifically, it is desirable to provide said perforated partition wall inside the enlarged portion 12 in a manner as indicated in FIG. 11. The size of the holes provided in the partition wall is determined by taking into account such elements as the capacity of the enlarged portion and the speed of the current of the liquid. Great convenience will be obtained by providing the perforated partition wall spaced along the wall of the enlarged portion 12 so as to be removable. It is desirable to provide a perforated partition wall not only in the enlarged portion 12 but also in the iso-calibrated portion 13, as is shown in FIG. 12.

Figure 14:
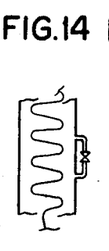
Figure 15:
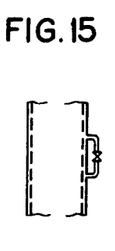
FIG. 15 is an arrangement in which a bypass and a perforated partition wall are jointly provided.
Figure 16:
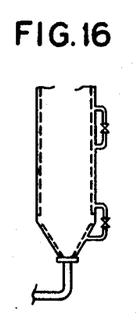
FIGS. 16 and 17 are schematic representations of other arrangements in which a perforated partition wall is provided inside the up-going path and also bypasses are provided between the enlarged bottom portion and the adjacent iso-calibrated portion and also on the iso-calibrated portion.
Figure 17:
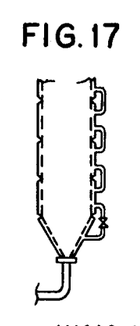

In the iso-calibrated portion 13, the treating liquid already has a substantially stabilized flow speed. The material enters therein in a state in which its longitudinal folding can be easily completed or in a state in which it is nearly completely longitudinally folded. In this stage of operation, however, the material is transferred in the portion 13 continuously while the liquid flows thereinto at a relatively high speed. On account, partly, of the resistance from the liquid already contained in the portion 13 against the in-coming current of the liquid, one cannot always expect a smooth flow of liquid. In addition, due also to the presence of the material in the current of liquid, there often arises a turbulence of current even from a very trifling cause. Therefore, in case the iso-calibrated portion 13, in particular, is of a considerable length, it is desirable to provide a bypass, for example a pipe, as shown in FIGS. 13 and 14 in a manner similar to that described above so that the treating liquid may be able to freely pass therethrough. The provision of a valve on the bypass will afford the convenience that the flow rate can be controlled. In this instance, the bypass need not be restricted to only one site, but it may be provided at two or more places. Also, the provision of a perforated partition wall inside the wall as shown in FIG. 15 in a manner similar to that described above, will bring about a desirable effect on the current of the liquid. Furthermore, the provision of a bypass in the portion before and behind the site from which a part of the liquid is drained by means of a pump, in a manner similar to that described above, will be effective. Or alternatively, a combined arrangement may be made, that is, a bypass is provided between the enlarged portion 12 having an inclined inner wall face and the iso-calibrated portion at a position closer to the said portion, and at the same time another bypass is provided in the iso-calibrated portion, in a manner as shown in FIGS. 16 and 17. FIG. 16 shows an instance where the iso-calibrated portion consists of only one section. FIG. 17 shows an example where the iso-calibrated portion is divided into two or more sections and where the perforated partition wall provided is also divided into sections of corresponding number accordingly, and two or more bypasses are also provided.

With respect to the apparatus of the present invention, there is encountered not much trouble when the apparatus is one having a relatively small capacity. In case it has a large capacity, however, the overall height of the apparatus inevitably will increase. In case it is intended to use an apparatus of a large capacity for an operation which can be performed with an apparatus of a smaller capacity, it may happen that the performance of the operation, for example dyeing, becomes impossible when the flow capacity is less than a certain level when the same bath ratio is employed. In such case, it will be necessary to replace the apparatus as a whole with a different apparatus depending on the extent of the capacity required, or to replace at least a certain part of the apparatus, such as the down-going path 2 and/or the upgoing path 1 and/or the intermediate path 3 connecting the two paths. The aforesaid problem may be solved by replacing one part of the apparatus, for example, by replacing the up-going path 1 and/or the down-going path 2 with another path or paths having a different cross sectional area. This replacement, however, in fact, is not necessarily a desirable procedure. Where such problem is involved, it is desirable to solve this problem according to the following procedure.

Figure 18:
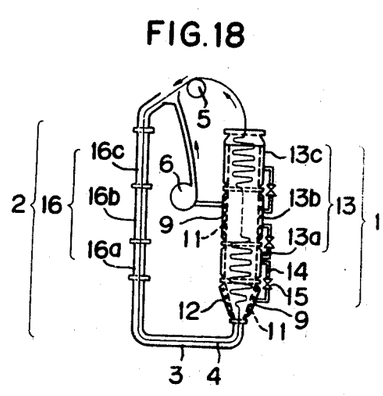
FIG. 18 shows an arrangement in which both paths are divided into three corresponding sections, respectively.
Figure 19:
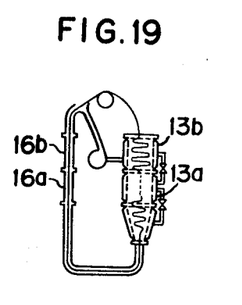
FIG. 19 shows an arrangement similar to FIG. 18 except that one of the sections of each path, as a pair, is omitted.
Figure 20:
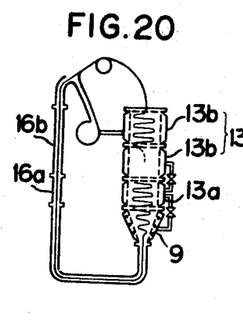
FIG. 20 shows an arrangement in which one of the sections of the up-going path corresponding to that of the down-going path is divided further into two sub-sections.

The following description will be made with respect to solving this problem by referring to FIGS. 18 through 20. In FIG. 18, the enlarged portion located at the bottom of the up-going path 1 is of a shape which is of an inverted frusto-conical shape extending from the juncture of said path 1 with the path 3, or in other words, it has an upwardly flaring funnel shape. The iso-calibrated portions of both paths are divided into two or more sections. Here, the iso-calibrated portions 13 and 16 of both the up-going path 1 and the down-going path 2 are divided into at least two sections, for example, into sections 13a, 13b, 13c, and 16a, 16b, 16c, respectively, as shown in FIG. 18, so that, depending on the quantity of the material to be treated, only the sections 13a, 13b and the sections 16a, 16b are used, by omitting a desired section from each iso-calibrated portion, i.e., the section 13c and the section 16c. This is illustrated in FIG. 19. While, in FIG. 18, there is shown an arrangement where the iso-calibrated portions of both paths 1 and 2 are divided into an equal number of sections, i.e., three sections, respectively, it should be understood that the number of the sections need not be limited to only three, but as many sections as desired may be provided, provided that the number is at least two. Thus, there is no particular restriction on the number of sections. Also, the length of the sections need not be identical to each other, provided that the corresponding sections on both paths have the same length. Furthermore, the iso-calibrated portions 13 and 16 need not be divided into sections of equal number. For example, the section 13b in FIG. 18 may be divided into two or more sub-sections. An example of this is illustrated in FIG. 20. The number of the sections and the length of each section are determined by taking into account the following consideration including the standard amount treated and the purpose of the operation, such as for dyeing, degumming or washing with water. The provision of an excess number of sections will complicate the operation.

As has been described, the flow speed of the treating liquid is substantially stabilized in the iso-calibrated portion 13. However, since the liquid is flowing at a relatively high speed, and the material is being fed continuously, the current of the liquid will not always be smooth. The current can be deranged even by a very trifling cause. Therefore, in case the iso-calibrated portions 13 are of a substantial length as is the case with an apparatus of a large capacity, it is preferred to provide a bypass, for example a pipe, between the funnel shape portion 12 and the bottom 13a of the iso-calibrated portion 13 as shown in FIGS. 18 through 20 and also a bypass between each section of the iso-calibrated portion 13 so that the treating liquid may freely pass therethrough. The provision of a valve in the bypass is convenient because the flow rate can be controlled. In such instance, the provisions of the bypas need not be limited to only one site, but such bypass may be provided at two or more sites, as required. The number of the bypasses to be provided in one section need not be only one, but two or more bypasses may be provided. The bypasses which are provided between each section of the iso-calibrated portion may comprise a combination of those pipes with and without a valve.

Figures 21, 22:
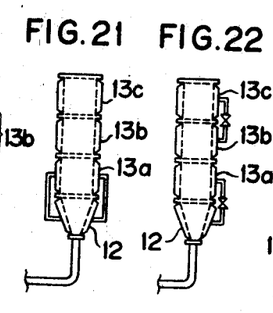
FIGS. 21, 22 and 23 show various different modifications, respectively.
Figure 23:
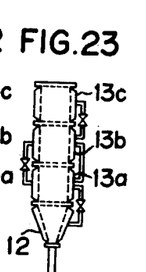
Figure 24:
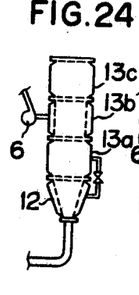
FIGS. 24, 25 and 26 show several different modifications, respectively.
Figure 25:
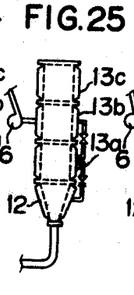
Figure 26:
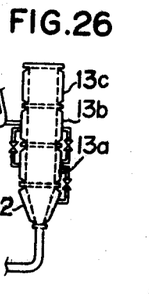

Some examples of various combinations of bypasses which are provided between each section of both the funnel portion 12 and the iso-calibrated portion 13 are illustrated in FIGS. 21 through 23. FIG. 21 shows an instance where two bypasses are provided only between the funnel portion 12 and 13a. FIG. 22 illustrates another instance where bypasses each having a valve are provided between the funnel portion 12 and 13a, and also between 13b and 13c. FIG. 23 shows still another instance where bypasses each having a valve are provided between the funnel portion 12 and 13a and also between 13b and 13c, while a bypass without a valve and a bypass with a valve are provided between 13a and 13b. It has been already stated that it is desirable to provide, in a manner so as to be removable, a perforated partition wall not only in the funnel portion 12 but also in the iso-calibrated portion 13. The perforated partition wall which is provided in the iso-calibrated portion 13 may be such that it may be provided in each section, for example 13a, 13b, 13c, of the iso-calibrated portion, or alternatively, a perforated partition wall which is common to all of these sections may be provided, or further alternatively, a combination of these two kinds of perforated partition walls may be employed. For example, the section 13a may be provided with an independent partition wall, while the sections 13b and 13c may have a perforated partition wall which is common to both. In these instances, it is convenient to provide the perforated partition wall or walls in a manner so that they can be removed. The size and the number of holes of the perforated partition walls may be varied for each section, as required. The partition wall which is provided near the opening, leading to the iso-calibrated portion 13, of the duct 7 which is coupled to the pump for draining a part of the treating liquid also serves for preventing the material under treatment from being sucked into said duct. A perforated partition wall may be provided only in the vicinity of said opening. An example of the installation of a perforated partition wall is shown in FIGS. 24 through 26. FIG. 24 shows an instance wherein a partition wall is provided only in the funnel shape portion 12 and in section 13b, and wherein a bypass with a valve is provided between the funnel shape portion 12 and section 13a. FIG. 25 illustrates an instance where an independent perforated partition wall is provided in each of the sections, namely, the funnel shape portion 12, and sections 13a, 13b and 13c, while a bypass with a valve is provided between the funnel shape portion 12 and section 13a and also between sections 13a and 13b, respectively. FIG. 26 illustrates an apparatus where an independent perforated partition wall is provided in the funnel shape portion 12 and in section 13c, while a common perforated partition wall is provided for sections 13a and 13b, and one bypass with a valve is provided between the funnel shape portion 12 and section 13a, and two bypasses with valves between sections 13a and 13b, respectively.

The material to be treated travels downwardly through the down-going path 2 in the form of a rope along with the current of the treating liquid, and after passing through the intermediate path 3 connecting the up-going pah 1 and the down-going path 2, it gets to the bottom portion of the up-going path 1. At this moment, the material is in the form of a rope or in a state quite close thereto. The material in rope form which is in the bottom portion of the up-going path 1 becomes transversely unfolded, spread and stretched and is converted to a state of being easily longitudinally folded and is finally folded by the gradually slowed-down current of the treating liquid entering into the lowermost portion of the up-going path 1. The transverse unfolding of the material as it is transferred from the narrow intermediate path 3 into the enlarged portion located at the bottom of the up-going path needs to be effected to such an appropriate extent as is convenient for the subsequent treatment of the material. In case the material is transversely unfolded, spread and stretched too quickly to an excessive extent, such a premature and excessive unfolding, spreading and stretching of the material constitutes a cause for the stagnation and/or the entanglement of the portions of the material due to the loss of balance between the reduction in the speed of movement of the material as it enters into the enlarged portion and the speed with which the material is brought into said enlarged portion 12. This is a circumstance which requires particular attention in the present invention which contemplates unidirectional circulation of the treating liquid together with the material to be treated by said liquid. Also useful to this end are the following arrangements of the present invention which have been already described: that the enlarged portion communicating with the narrow intermediate path 3 through which the material and the treating liquid pass is given an inverted frusto-conical shape or funnel shape; that a perforated partition wall is provided inside the wall of said funnel shape portion; and that a bypass is provided between the bottom portion of the up-going path 1 and the iso-calibrated portion 13. Depending on the factors such as the type of the material to be treated, the purpose of the treatment and the velocity of the treatment, however, the foregoing arrangements may be found still insufficient in some cases. Depending on the type of the material to be treated, or, in some instances where it is desired to conduct the treatment at high velocity which is naturally accompanied by an increased speed of the current of the treating liquid, there is a tendency that the material is transversely unfolded, spread and stretched too quickly right after its entry into the enlarged portion 12, causing the occurrence of stagnation and entanglement of the portions of the material in the system or the occurrence of blocking of the entrance of the enlarged portion 128. In order to solve this problem, it is desirable to resort to the following procedure.

Figure 27:
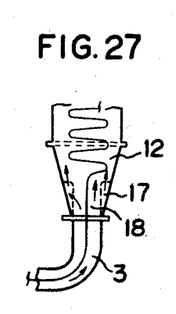
FIG. 27 shows an arrangement in which the enlarged bottom portion is provided with only the means for controlling the degree of folding of the material to be treated.
Figure 28:
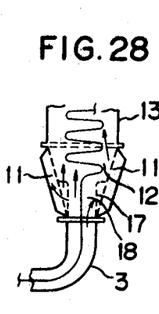
FIG. 28 shows an arrangement similar to FIG. 27 except that a perforated partition wall is additionally provided.
Figure 29:
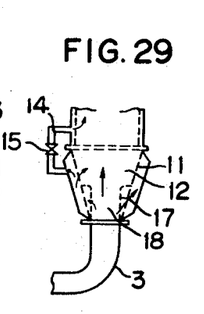
FIG. 29 shows an arrangement similar to FIG. 28 except that a bypass is additionally provided.
Figure 30:
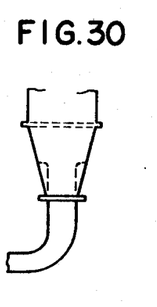
FIGS. 30 through 33 are diagrammatic representations, showing various modifications of the means for controlling the degree of unfolding of the material being treated.
Figure 31:
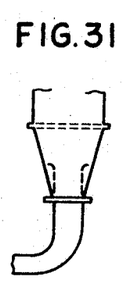
Figures 32, 33:
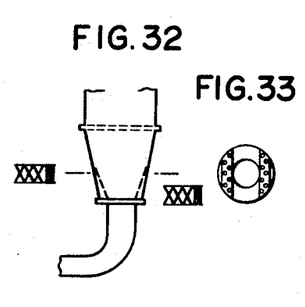
Figure 34:
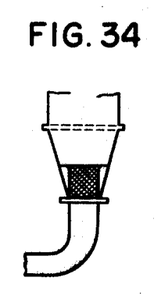
FIGS. 34 and 35 are diagrammatic representations, showing still other modifications of the means for controlling the degree of unfolding of the material to be treated.
Figure 35:
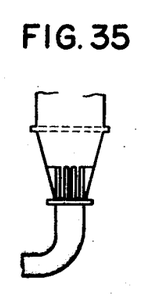

Specifically, there is provided, at the bottom entrance of the enlarged portion 12 located at the lower portion of the up-going path communicating with the narrow path 3, a means for controlling the degree of the transverse unfolding, spreading and stretching of the material, said means having small openings which permit only the treating liquid coming from the central main path of the enlarged portion 12 to pass through these small openings toward the wall of said enlarged portion 12, said means also having a central main path having such size as is sufficient for the material to pass freely therethrough so as to be directly transferred into the enlarged portion 12. This control means will hereunder be described in detail by referring to the drawing. In FIG. 27, the material and the treating liquid are passed through the intermediate path 3 in the direction of the arrow. The enlarged portion 12 located in the lower portion of the up-going path 1 flares upwardly in an inverted frusto-conical or funnel shape beginning at the entrance of the up-going path 1 at which the path 1 joins the intermediate path 3. Reference numeral 17 represents an unfolding, spreading and stretching control means having a cylindrical shape with a diameter identical to that of the intermediate path 3 and having its bottom end located at the entrance of the enlarged portion 12, namely, at the juncture of the intermediate path 3 and the enlarged portion 12 and also having its upper end portion diverging and extending toward the wall of the enlarged portion 12 and eventually reaching there. This unfolding control means is provided with small circular perforations or openings throughout its entire surface. With the entry of the treating liquid into the enlarged portion 12, a part of this liquid passes through these small openings of the means 17 toward the wall of the portion 12, and thereafter passes through the openings located atop the means 17, and again enters into the enlarged portion 12. The remainder of the liquid coming from the intermediate path 3 together with the material, passes through the central main passageway 18 upwardly and proceeds into the upper portion of the enlarged portion 12. The material is for the first time transversely spread and stretched as it passes the upper end of said passageway 18, and is then folded longitudinally neatly. The material which has been thus transversely unfolded and longitudinally folded never becomes stagnant at the portion of the juncture between the bottom end of the enlarged portion 12 and the intermediate path 3. Since the flow speed of the current of the treating liquid is appropriately adjusted as it enters into this enlarged portion, there occurs no stagnation or entanglement of the portions of the material being treated. Needless to say, the openings provided in the means 17 need not be round in shape, or do they have to be uniform in size, nor is there any limitation on the density of perforations between the upper portion and the lower portion of the means 17. Neither is there any particular limitation on the height of the means 17. These arrangements are all determined as desired by taking into consideration the factors such as the type of the material being treated, the purpose of the treatment and the velocity of the treatment. FIG. 28 illustrates an example where a partition wall 11 having openings, for example, round shape perforations, is provided inside the wall of the enlarged portion 12. In this instance, a part of the treating liquid which passes through the small openings of the means 17 from the central main path 18 and proceeds toward the wall of the enlarged portion 12 is urged further to pass through the openings of the perforated partition wall 11 toward the wall of the enlarged portion 12 and thereafter it again passes through the openings of the perforated partition wall 11 and enters into the enlarged portion 12. In this way, the current of the treating liquid which passes from the intermediate path 3 into the enlarged portion 12 is appropriately slowed down to impart a further desirable effect on the transverse unfolding, spreading and stretching of the material being treated. Fig. 29 illustrates another example where a bypass 14 is further provided between the enlarged portion 12 and the iso-calibrated portion 13 communicating with the enlarged portion 12. By this arrangement, the flow speed of the treating liquid is further controlled to afford an even better effect on the transverse unfolding, spreading and stretching of the material being treated. In FIGS. 27 through 29, there are shown examples where the bottom end of the means 17 is located at the juncture of the intermediate path 3 and the enlarged portion 12. However, the bottom end of the means 17 may be formed so as not to extend up to said juncture, and there may be provided a space therebetween as illustrated in FIG. 30. Also, the upper end of the means 17 need not extend to reach the wall of the enlarged portion 12 as shown in FIG. 31. In FIGS. 27 through 29, the means 17 is shown as having a cylindrical shape with a diameter identical to that of the intermediate path 3. This means 17, however, may have a diameter smaller than that of the intermediate path 3, and, furthermore, the configuration of this means 17 is not restricted to cylindrical shape, but the means 17 may be formed in the shape of a column having a rectangular cross section, or alternatively, it may be formed with two plates arranged in parallel. FIGS. 32 and 33 illustrate an example of such arrangement. FIG. 32 is a longitudinal sectional view and FIG. 33 is a transverse sectional view taken along the line XXXIII—XXXIII in FIG. 32. In FIGS. 27 through 29, the small openings of the means 17 are shown as being circular perforations. However, these openings are not particularly restricted as to their shape. For example, the means 17 may be made with a net or screen which is formed in a tubular shape as shown in FIG. 34, or alternatively, it may have such a shape as shown in FIG. 35 wherein the means is of a cylindrical shape provided with longitudinal slits of a predetermined desired width. Thus, the means 17 is subject to no restriction with respect to its general configuration, and the shape and the size of its perforations or openings. any type of means 17 may be used provided that it meets the purpose and the role assigned thereto, and this will be understood from the foregoing description.

By adopting this apparatus, the knitted or woven material which is transferred together with a current of the treating liquid through the narrow intermediate path 3 into the enlarged portion is appropriately transversely unfolded, spread, stretched and longitudinally folded due to appropriately controlled flow speed, the direction and the flow rate of the current of the liquid passing therethrough, without causing stagnation or entanglement of the portions of the material being treated, and without being accompanied by the blocking of the entrance of the enlarged portion.

Some types of knitted or woven materials, especially knitted or woven materials made of fibers such as acrylic synthetic fibers, develop changes in their softness due to the changes in the temperature which is altered during the treatment, and as a result, they loose some of their volume. The amount of this loss of volume varies depending on such factors as the type of the knitted or woven material being treated and the purpose of the treatment. However, the amount of this loss of volume of the material under treatment can amount to a great value, such as about ½ to ¼ of its volume at normal temperature. This phenomenon occurs particularly often in jersey cloth made of acrylic synthetic fibers among knitted materials and woven materials with respect to the type of material, and occurs in dyeing with respect to the purpose of the treatment, particularly in dyeing which is conducted at a relatively high temperature. After such factors as the type of the material being treated, the purpose of the treatment and the conditions of the treatment are determined, the flow rate of the treating liquid is determined in accordance with the capacity of the apparatus to be used. The dimensional relationship between the down-going path having a small cross sectional area, the up-going path having a large cross sectional area and the intermediate path connecting these two paths are necessarily established for each type of apparatus prior to starting the operation. Therefore, in case there occurs a change in the volume of the material being treated due to the changes in the temperature which is altered during the treatment, this will be accompanied by a change in the relative relationship between the volume and the flow speed, causing a loss of the necessary flow rate and accordingly a change in the velocity of the treatment and further a lack of uniformity of the treatment, all of which are undesirable. When, however, the pressure of the pump is elevated in such a case as described above to increase the flow rate of the liquid, it sometimes causes a vortex current in the vicinity of the entrance of the up-going path. This vortex current can be the cause for various troubles, and is therefore undesirable. In order to solve this problem, it is necessary to adjust the flow rate of the treating liquid in accordance with the changes in the volume of the material in each of the different periods of the treatment to thereby maintain the uniformity of the operation. To this end, it is desirable to resort to the following procedure.

Figure 36:
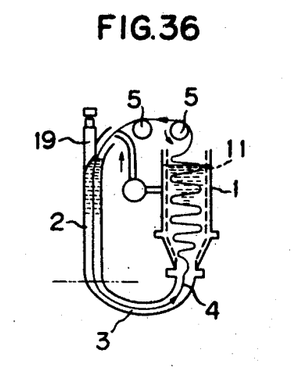
FIG. 36 shows an example of the apparatus of the present invention equipped with this means.
Figure 37:
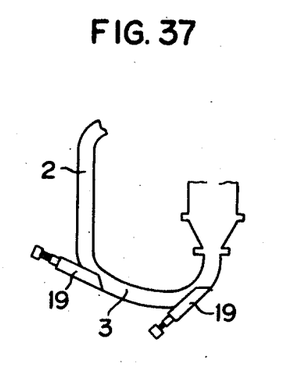
FIG. 37 illustrates a modification showing different positions at which this means can be atached.
Figure 38:
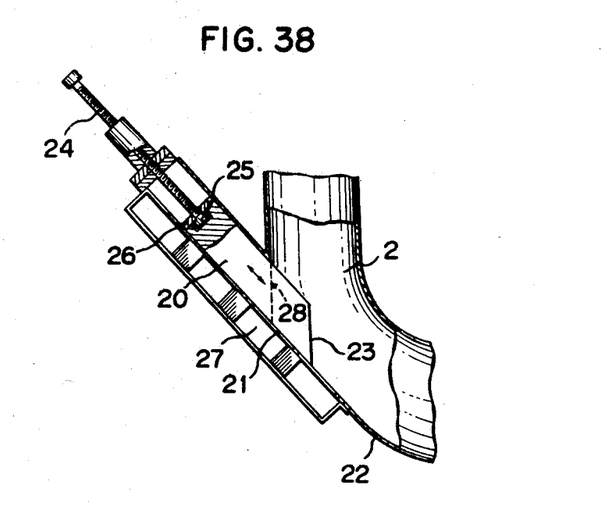
FIG. 38 illustrates the detailed structure of this means on an enlarged scale.

Specifically, means capable of controlling the cross sectional areas of the paths are provided at appropriate sites so that the flow rate of the treating liquid may be altered or adjusted as required to thereby carry out uniform treatment. This will be explained hereunder by referring to the drawing. In FIG. 36, a means 19 is provided in the upper portion of the down-going path 2 at the curvature of this path and along the outer wall thereof in such manner that this means 19 extends into the path from outside the wall and along the wall of the path. This means 19 is constructed that it is provided with a screw mechanism in its outer portion and that the foremost end of the rod can be urged to move back and forth by virtue of this screw mechanism so that, as a result, the cross sectional area of the path can be adjusted. FIG. 37 illustrates a modified example of the position at which this means 19 is provided. In this modified example, the means 19 is provided, in a similar fashion, at the bottom end of the down-going path 2 and/or at the curvature of the intermediate path 3 near the up-going path 1. The detailed structure of the means 19 is illustrated in FIG. 38. Reference 2 represents a down-going path. Numeral 20 represents a row which makes forward and backward movements in accordance with the tightening and the loosening operation of the screw mechanism. The foremost end portion of the rod is located inside the path. The lower peripheral surface 21 of the rod is in alignment with the outer wall surface 22 of the path. The plane of the foremost end face of the rod is inclined outwardly from inside the path so as to comply with the degree of curvature of the path in order to avoid the occurrence of a vortex current of the treating liquid in the zone between said foremost end face of the rod and the inner wall surface of the path. Numeral 24 represents a threaded portion of the screw, and numeral 25 represents the foremost end portion of the screw which is retained in place by a member 26 which, in turn, is attached to the rod 20. Numeral 27 represents a sliding mechanism for insuring positive forward and backward movements of the rod 20. This sliding mechanism is provided at the outer side of the down-going path 2 along the outer wall thereof, and is associated with the rod 20.

Figures 39, 40:
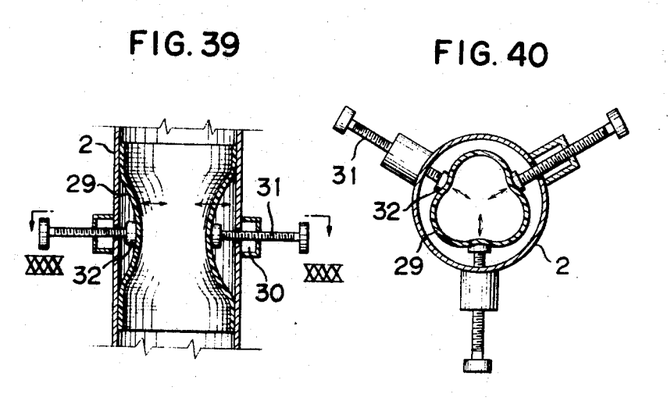
FIGS. 39 and 40 are diagrammatic representations, showing another modifications of the means for controlling the cross sectional area of a path.

The rod 20 is moved forwardly by the loosening of the screw and is moved rearwardly by the tightening of the screw. When the rod 20 makes a forward movement, the cross sectional area of the path 2 decreases, while as the rod makes a rearward movement, the cross sectional area increases. When the rod 20 moves backwardly and when as a result the plane 23 of the foremost end thereof comes to the position indicated by the broken line 28, the path 2 is rendered to its fully open state, which means that the path 2 is rendered to its normal state as a passageway. Thus, the cross sectional area of the path can be adjusted by the tightening or the loosening of the screw. Another example of the means 19 is illustrated in FIGS. 39 and 40. FIG. 39 is a longitudinal sectional view through the path 2. FIG. 40 is a transverse sectional view taken along the line XXXX—XXXX in FIG. 39. The member 29 is formed in tubular shape of an elastic material such as rubber, metal or other appropriate elastic materials, and is attached in the passageway as shown in FIG. 39. Reference numeral 30 represens a screw mechanism, wherein numeral 31 represents a threaded portion, and numeral 32 represents the foremost end of the screw. By loosening and tightening the screw, it moves in the directions indicated by the arrows. When the screw is tightened, the portions of the member 29 other than the portions fixed at both ends are pressed by the forward end 32 of the screw and are forced to move inwardly of the path, while when the screw is loosened, the member moves outwardly of the path. When the screw is loosened to a full extent, the member 29 moves outwardly to the inner wall line of the path so that the path assumes its fully opened posture and restores its normal state. FIG. 39 shows the arrangement where the screw mechanism is employed to move the elastic member 29. In lieu of the movement of the elastic member 29 being effected by the screw mechanism, the movement of the elastic member 29 may be controlled by the injection and the exhaustion or draining of the air or liquid into and from outside the path.

Figure 41:
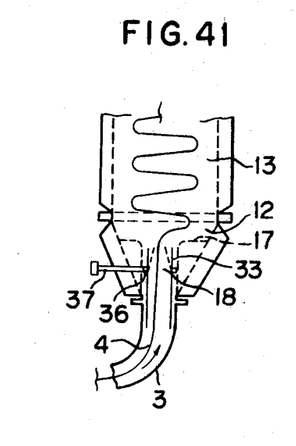
FIGS. 41 and 42 are diagrammatic representations, showing still another modification of the means for controlling the cross sectional area of a path.
Figure 42:
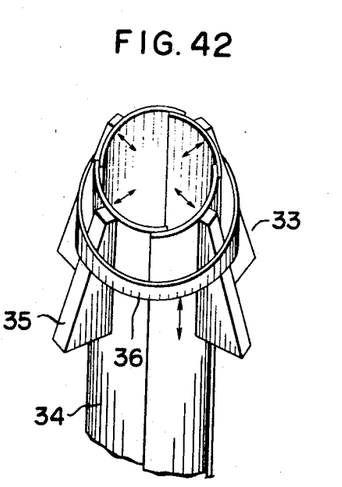

Still another example of said means is illustrated in FIGS. 41 and 42. FIG. 41 is a longitudinal sectional view showing the manner in which the means of the present invention is attached. FIG. 42 is a perspective view of the same means. The means 33 is attached, in a manner as shown in the drawing, centering around the joint portion between the enlarged bottom portion 12 of the up-going path and the intermediate path 3. The means 33 is of a cylindrical shape and its lower portion is attached along the inner wall of the path 3, with its upper portion extending into the enlarged portion 12. In case an unfolding control means 17 is used, the means 33 is provided so that its upper portion is located within the central passageway 18 of the means 17. As is clear from FIG. 42, the means 33 is structured so that a plurality of plates 34 made of an elastic material, such as elastic steel plates, adjacent small lateral end portion overlapped to form a cylindrical configuration. Each plate is provided with a projection such as the one indicated by 35 which is of a shape having an increasing height as it extends downwardly. Around the outer peripheries of the respective projections, there is mounted a ring 36. This ring 36 is inelastic, and has a constant diameter. By moving this ring downwardly, the diameter of the lower portion of the cylindrical body consisting of the plates 34 is not altered, but the upper portions of the plates forming a cylindrical body are urged to bend inwardly as indicated by the arrow, so that the cross sectional area of this portion of the cylindrical body decreases. By moving this ring 36 upwardly, that is, in the reverse way, the upper portion of the cylindrical body expands outwardly, with the result that the cross sectional area of this portion increases. The broken line inside the central main passageway 18 in FIG. 41 indicates the position assumed by the upper portion of the cylindrical body when it bends inwardly. The means 33 is so constructed that this ring 36 can be operated, for vertical movement, from outside the means 33 by actuating the means 37. By moving the ring 36 in the vertical directions, as required, the cross sectional area of the means 33 can be adjusted.

The foregoing description has been directed to the operation in connection chiefly with dyeing. The apparatus of the present invention can also be used in degumming, washing or any other treatment utilizing a liquid. This will be clearly understood from the foregoing description.

According to the present invention, there are provided a number of outstanding advantages: that it is possible to treat knitted or woven materials, especially woven fabrics, knitted goods or other cloths, with a liquid and at a high speed by the use of an apparatus having a relatively simple structure; that owing to the minimized adverse effect from the current of the treating liquid on the material under treatment, there arises hardly any fluffing or the development of broken pattern of the material and, accordingly there occurs no roughness of the surfaces of the treated material; that due to the reduced tension applied to the material as it is transferred during the course of treatment, the quality and the feel of the material are not damaged; and that because the material is subjected to the transverse unfolding action of the current of the treating liquid when the material is immersed in the liquid, there occurs no formation of fixed wrinkles so that the development of wrinkles and other markings in the finished material is eliminated. In addition, there are provided further advantages that the material is substantially free from any adverse effect from being circulated in the apparatus since this circulation is performed quite smoothly, that the use of a small head type pump minimizes the formation of bubbles, resulting in that the adverse effect due to bubbles is minimized, and also that because the fluctuation in the power of the pump due to the changes in the temperature which is altered during the operation is minimized, no ill effect is imposed on the movement of the material undergoing treatment.

Furthermore, by forming the enlarged portion located in the bottom portion of the up-going path with a funnel shape and by providing a perforated partition wall spaced along the inner wall of the up-going path, and by further providing, as required, a bypass between said funnel shape portion and the iso-calibrated portion or an additional bypass or bypasses in the iso-calibrated portion, it is possible to appropriately adjust the relationship between the current of the liquid and the material under treatment in the stage of operation when the material under treatment, after proceeding downwardly together with the treating liquid through the downgoing path, and passing through the intermediate path which connects the up-going path to the down-going path, enters into the funnel shape portion and is eventually longitudinally folded therein in accordance with the slow-down of the flow speed of the current of the liquid. Since this reduction in the flow speed of the liquid is effected quite smoothly, there arises no turbulence in the current of the treating liquid and there occurs no entanglement of the portions of the material under treatment. Thus, the material is longitudinally folded neatly in gradual sequence and the folded cloths are carried along by the current of the liquid with a great deal of smoothness. As a result, it is possible to perform a continuous smooth operation, and this greatly enhances the workability of the operation and makes it possible to perform a desired homogenous treatment. As described, the present invention provides outstandingly desirable advantages and effects.

By providing the aforesaid apparatus with means for controlling the transverse unfolding, spreading and stretching of the material under treatment in the area inside the entrance of the enlarged bottom portion of the up-going path having a large cross sectional area, there is obtained a further advantage that the smooth running of the treating liquid and the smooth transverse unfolding, spreading and stretching of the material under treatment are facilitated and also that the stagnation of the material in the vicinity of the entrance of the enlarged bottom portion of the up-going path is prevented.

Also, by arranging so that both of the up-going and the down-going paths are divided into two or more corresponding sections and also arranging so that the apparatus may be operable even by removing at least one pair of these divided sections from these two paths, it becomes possible to adopt, by a simple procedure and with great ease, a treating apparatus designed for a large capacity to an operation which can be performed on a much smaller capacity, and thus these arrangements provides a great convenience because of its versatility.

By further appropriately providing, in a path or paths, means for controlling the cross sectional area of such path or paths, it becomes possible to appropriately control the flow rate of the treating liquid and to thereby perform the smooth treatment of the material, even such materials as could not be treated with a conventional apparatus because of the development of changes in the volume of the material which take place due to the altered temperature during the course of treatment.

As such, the method as well as the apparatus of the present invention can be applied not only to the dyeing which is performed according to the ordinary method of the prior art, but also to such as cannot be performed by the recently developed method utilizing a jet nozzle for quickly drawing up a cloth or like material from a dyeing bath and designed for circulating both the material and the treating liquid through a duct tube and the bath.

The present invention is suited for performing a treatment with a liquid at a high temperature and/or under a high pressure, and an outstandingly desirable effect is obtained when the present invention is applied especially to dyeing which is performed at a high temperature and under a high pressure. Although the present invention can be applied to the treatment with liquid of woven materials, knitted materials and cloths of all other kinds, a prominent effect is brought forth especially when it is applied to the treatment with a liquid of such sheer textures as are featured, above all, by their feel, and also of such materials as knitted goods which stretch easily.

What is claimed is:

1. A method for treating knitted material or woven material with a treating liquid by the use of a treating apparatus comprising a vessel including an up-going path having a large cross sectional area, a down-going path having a small cross sectional area and an intermediate path connecting said up-going path and said down-going path, said apparatus further having means for draining the treating liquid from said up-going path and supplying the same to the down-going path from thereabove and means for drawing up the material being treated from the up-going path and feeding the material to the down-going path, the treatment of said material comprising the steps of draining said treating liquid from said up-going path and supplying the same into said down-going path from thereabove so that the treating liquid is allowed to flow down through said down-going path and flow upwardly through said up-going path while smoothly and sequentially reducing the flow speed of the treating liquid as the treating liquid enters into the bottom portion of the up-going path, the treated material being drawn up from the up-going path containing the treating liquid and being fed into said down-going path to join the down-going stream of the treating liquid passing therethrough so as to be driven by said stream to move downwardly through the down-going path in a transversely bunched condition and to proceed upwardly through the up-going path while being permitted to transversely spread out and eventually being longitudinally folded neatly in a gradual sequence as the material enters into the bottom portion of said up-going path and proceeds upwardly therethrough, whereby said material is treated during its circulation in the treating apparatus by said circulating treating liquid.

2. A method according to claim 1, wherein a part of the treating liquid is drained successively from an intermediate portion of said up-going path by means of a small head large capacity type pump and is supplied to the down-going path from thereabove so that the liquid is allowed to proceed downwardly through the down-going path by virtue of the difference in head of the liquid between the down-going path and the up-going path, and wherein the portions of the material located, in a longitudinally folded state, in the upper portion of said up-going path are successively drawn up by said feeding means provided above said treating vessel, and wherein the material being treated is moved upwardly by the ascending current of the treating liquid in the up-going path while being permitted to transversely spread out and eventually being longitudinally folded neatly in a gradual sequence as the material enters into the bottom portion of said up-going path and proceeds upwardly therethrough whereby the material stays in a longitudinally folded state in the upper portion of the up-going path containing the treating liquid.

3. A method according to claim 1, wherein the material being treated is moved upwardly through said up-going path while being permitted to transversely spread out and eventually being longitudinally folded neatly in a gradual sequence as the material enters into the bottom portion of said up-going path and proceeds upwardly therethrough, by moving said material upwardly through the up-going path whose bottom portion communicates with the intermediate path connecting said down-going path and said up-going path at their lowermost ends, said bottom portion being of an inverted frusto-conical shape, said up-going path being provided with a perforated partition wall extending along and spaced from at least a part of the inner wall of said up-going path.

4. A method according to claim 3, wherein said up-going path has a bottom portion of inverted frusto-conical shape communicating with said intermediate path connecting said down-going path and said up-going path at their lowermost ends, the upper portion of the up-going path communicating with said bottom portion and being iso-calibrated for a substantial distance along its length, and a perforated partition wall is provided at least in the inverted frusto-conical bottom portion extending along and spaced from the inner wall of said portion and at least one bypass for the passage of the treating liquid is provided between said inverted frusto-conical bottom portion and said iso-calibrated portion, the flow speed of the liquid being smoothly and sequentially reduced as it flows through at least said bottom portion and a portion of the treating liquid flowing through said partition wall and said bypass to effect stabilized flow conditions in said upper portion.

5. A method according to claim 4, wherein said up-going path is provided with at least one bypass along the length of said iso-calibrated portion and including the step of forwarding a portion of the treating liquid through said bypass.

6. A method according to claim 3, wherein said up-going path is provided with a steam-heater at least between the inner wall of its inverted frusto-conical bottom portion and said perforated partition wall provided in said bottom portion and including the step of forwarding a portion of the treating liquid into the space between said inner wall and said partition wall in heat exchange relationship with said steam-heater.

7. A method according to claim 1, including the step of forwarding the material through means for controlling the degree of transverse, spreading out of said material as the material enters the bottom end of said up-going path.

8. A method according to claim 1, wherein both of said up-going path and said down-going path are so structured that each of them is divided into at least two sections respectively, each of said sections of one of these two paths constituting a pair with the corresponding section of the other of the paths and also that at least one of the pairs may be omitted as required.

9. A method according to claim 1, including the step of adjusting the cross sectional area of at least one of the paths of said treating vessel.

10. A method according to claim 1, wherein said liquid consists of a dyeing bath.

11. A treating apparatus for treating knitted material or woven material with a circulating treating liquid while said material is circulated in said treating apparatus, said apparatus comprising a vessel having a down-going path of a small cross sectional area, an up-going path of a large cross sectional area, said up-going path having a bottom portion so structured that the flow speed of the current of the treating liquid flowing thereinto is smoothly and sequentially reduced and an intermediate path connecting said up-going path and said down-going path at their bottom ends, said treating apparatus further including means for drawing up said material from said up-going path and for feeding said material into the upper portion of said down-going path and means for draining the treating liquid from said up-going path and for supplying the drained liquid to said down-going path from thereabove.

12. A treating apparatus according to claim 11, wherein said means for draining the treating liquid from said up-going path and for supplying the drained liquid to said down-going path comprises a small head large capacity type pump.

13. A treating apparatus according to claim 11, wherein said up-going path has an inverted frusto-conical bottom portion and wherein said up-going path is provided with a perforated partition wall at least in said inverted frusto-conical bottom portion.

14. A treating apparatus according to claim 13, wherein said up-going path is provided with at least one bypass between its inverted frusto-conical bottom portion and an iso-calibrated portion communicating with said bottom portion.

15. A treating apparatus according to claim 14, wherein said up-going path is provided with at least one bypass along the length of said iso-calibrated portion.

16. A treating apparatus according to claim 13, wherein said up-going path is provided with a steam-heater at least between the inner wall of its inverted frusto-conical bottom portion and said perforated partition wall provided in said bottom portion.

17. A treating apparatus according to claim 11, wherein said up-going path is provided with means for controlling the degree of transverse spreading out of the material to be treated inside the bottom entrance of said up-going path.

18. A treating apparatus according to claim 17, in which said means for controlling the transverse spreading out of the material comprises perforate tubular wall means disposed within, and being of smaller cross sectional area than, the bottom portion of said up-going path.

19. A treating apparatus according to claim 18, in which said tubular wall means has a cylindrical shape.

20. A treating apparatus according to claim 11, wherein said up-going path and said down-going path are so structured that each of them is divided into at least two separable sections respectively, each of said sections, of one of these two paths constituting a pair with a corresponding section of the other of the paths so that at least one of the pairs may be removed as required.

21. A treating apparatus according to claim 11, wherein at least one of the paths of said treating vessel is provided with at least one means for controlling the cross sectional area of said one of the paths.

22. A treating apparatus according to claim 21, in which said means for controlling the cross sectional area of at least one of the paths comprises an elongated member, means supporting said member for lengthwise movement into and out of said one path, said member being extendable through an opening in one of the walls of said one path and having an end face of substantially the same curvature as said one wall of said one path so that said member can be moved from a position in which said end face forms a continuation of said one wall of said one path and substantially closes said opening to a position in which said end face is positioned within said one path.

23. A treating apparatus according to claim 22, including screw means coupled to said member for moving same into and out of said one path.

24. A treating apparatus according to claim 11, wherein said vessel is of a closed type.

25. A treating apparatus according to claim 11, wherein said vessel is of an open type.

References Cited

UNITED STATES PATENTS 3,016,728  1/1962  Mann et al. _________ 68—178 X
3,280,602  10/1966 Schiffer ____________ 68—178 X

FOREIGN PATENTS 3,817,079  9/1963  Japan.

WILLIAM I. PRICE, Primary Examiner

U.S. Cl. X.R.

68—15, 177, 207